United States Patent [19]
Nakatani

[11] Patent Number: 5,341,185
[45] Date of Patent: Aug. 23, 1994

[54] CENTER COLUMN FRICTION CONTROL SYSTEM FOR VIDEO TRIPOD

[75] Inventor: Koichiro Nakatani, Tokyo, Japan

[73] Assignee: Velbon International Corporation, Torrance, Calif.

[21] Appl. No.: 22,013

[22] Filed: Feb. 24, 1993

[51] Int. Cl.⁵ .................... G03B 29/00; G03B 17/00; F16M 11/26; F16M 11/38
[52] U.S. Cl. .................... 354/81; 354/293; 248/188.5; 248/169
[58] Field of Search ............... 354/81, 293; 248/188.5, 248/169

[56] References Cited

U.S. PATENT DOCUMENTS

| | | | |
|---|---|---|---|
| 2,703,691 | 3/1955 | Minnis | 354/81 |
| 2,709,560 | 5/1955 | Resk | 354/293 |
| 3,705,703 | 12/1972 | Niggeloh | 354/81 |
| 4,324,477 | 4/1982 | Miyazaki | 354/293 |
| 5,203,871 | 4/1993 | Seo | 248/169 X |

Primary Examiner—Michael L. Gellner
Assistant Examiner—Jae N. Noh
Attorney, Agent, or Firm—Beehler & Pavitt

[57] ABSTRACT

Smooth vertical movement of the center column of a tripod is assured by resilient sleeves fitted on the column and urged by a spring against stationary inclined inner surfaces which deflect end portions of the sleeves against the column to maintain continuous frictional resistance against movement of the column through the bore.

8 Claims, 2 Drawing Sheets

CENTER COLUMN FRICTION CONTROL SYSTEM FOR VIDEO TRIPOD

BACKGROUND OF THE INVENTION

1. Field of the Invention

The present invention relates to tripods of the type used for supporting video or photo equipment and, more particularly, relates to an assembly for applying controlled friction for smooth operation of the rack and pinion mechanism which raises and lowers the center column of the tripod.

2. State of the Prior Art

Conventional tripods of the type used for supporting a camera and other video or photographic equipment have telescopically extendable legs which at their upper end are pivotally attached to a hub body which remains stationary and is supported on the tripod legs. A center column of the tripod moves axially through a bore in the hub. A hand operated crank is mounted to the hub and turns a pinion engaged to a gear rack which extends along the center column, for raising and lowering the column through the hub. The upper end of the center column supports a panning head on which a camera can be mounted. The height of the camera above a ground surface can be continuously adjusted by raising or lowering the center column of the tripod.

The center column can be fixed at a particular position relative to the hub by means of a detent mechanism. One known expedient for preventing unwanted vertical movement of the center column employs nearly cylindrical sleeves made of synthetic resin and mounted in the cylindrical bore through which moves the center column, providing a fixed resistance to sliding motion of the center column through the sleeves caused by friction between the inner circumferential surface of the sleeves and the outer circumferential surface of the center column. A drawback has been that after prolonged use of the tripod, the synthetic resin sleeves tend to deform or creep, resulting in a reduced resistance and support of the center column.

One attempt to overcome this problem is described in No. 11875 of the 1975 Official Utility Model Gazette of the Japanese Patent Office, and in No. 8194 of the 1991 Official Patent Gazette of the same patent office, in which a tripod is provided with the capability of adjusting the resistance to sliding motion of the center column by use of sleeves with ends which become narrower towards the top, and a nut which screws coaxially to the cylindrical bore in the hub body, altering the friction between the interior surface of the sleeves and the outer surface of the center column by displacing the inclined surfaces of the sleeves in a radial direction by turning and advancing the nut. The aforementioned tripod has a gear rack which extends in the axial direction on a side surface of the center pole, and by rotating a pinion mounted on the hub, the center column can be moved smoothly up and down through the hub.

This prior art mechanism suffers from the disadvantage that it is necessary to properly adjust the screw tension of the nut which tightens the sleeves for adjusting the resistance to motion of the center pole, and consequently problems may be caused by improper adjustment of the mechanism. If the nut is loosened while the tripod is in use, the center column will not be stably supported, and improper engagement between the rack and pinion may occur, possibly resulting in damage to the rack and/or the pinion.

The present invention addresses the aforementioned shortcomings of the prior art, and aims to provide an easy to use tripod in which an appropriate resistance to the motion of the center column is reliably maintained.

BRIEF SUMMARY OF THE INVENTION

A tripod for supporting video or photo equipment of the type having telescopically extendable legs pivotably attached to a hub, a center column slidable through a bore in said hub, and a crank for turning a pinion engaged to a gear rack along said column for elevating and lowering the column has resilient elements interposed between the column and the hub in the bore, a spring urging the resilient elements axially along the column into engagement with inclined mating surfaces operative for pressing the resilient elements against the column to provide frictional resistance to displacement of the column through the hub. The inclined mating surfaces may include an inclined surface in the bore, the resilient elements may comprise one or more sleeves slidable on the column, and the spring may be a coil spring about the column. Preferably the resilient elements are two sleeves slidable on the column and the spring is compressed between the sleeves.

In a preferred form of the invention the bore in the hub body has a portion of diminishing diameter forming a first inclined mating surface, and the tripod has a center tube for receiving the center column, the center tube having a portion of diminishing diameter forming a second inclined mating surface. First and second sleeves slidable on the column are contained between the inclined surfaces, and a coil spring compressed between the sleeves urges the sleeves apart so that end portions of each sleeve are pressed by a corresponding one of the inclined mating surfaces against the column to provide frictional resistance to displacement of the column through the hub. Each sleeve has an end portion divided by circumferentially spaced longitudinal slits into fingers or segments having wedge shaped ends displaceable by the corresponding inclined mating surface into frictional engagement with the column.

The friction between the sleeves and the center column is maintained even if the sleeves become worn and deformed, because the spring force urges the sleeves against the center column with a constant force, and a fixed resistance to motion of the center column can be maintained.

BRIEF DESCRIPTION OF THE DRAWINGS

FIG. 3 is a longitudinal cross-section of the tripod hub and center column friction control assembly.

DETAILED DESCRIPTION OF THE PREFERRED EMBODIMENT

Figure 1:
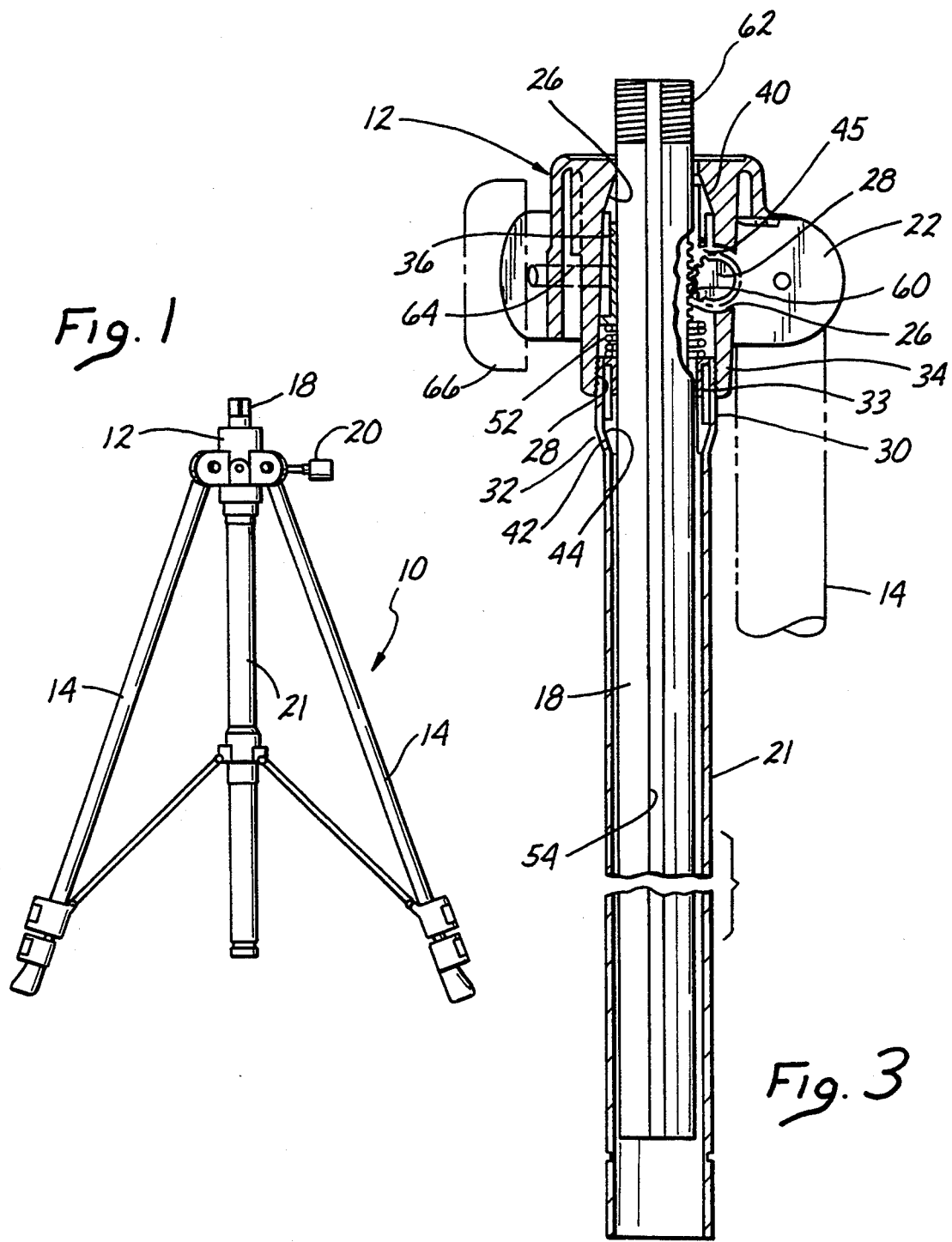
FIG. 1 is a side elevational view of a typical tripod, shown with its legs retracted, improved according to this invention.

With reference to the drawings, FIG. 1 shows a tripod generally designated by numeral 10 which has a generally cylindrical hub 12 to which are attached telescopically extendable legs 14. A center tube 21 is axially fixed to the hub 12 and contains a center column 18 which extends through the hub 12 and normally carries a panning head, which is not shown in the drawings. The center column 18 can be raised and lowered relative to the hub 12 by operation of a crank 20.

Figure 2:
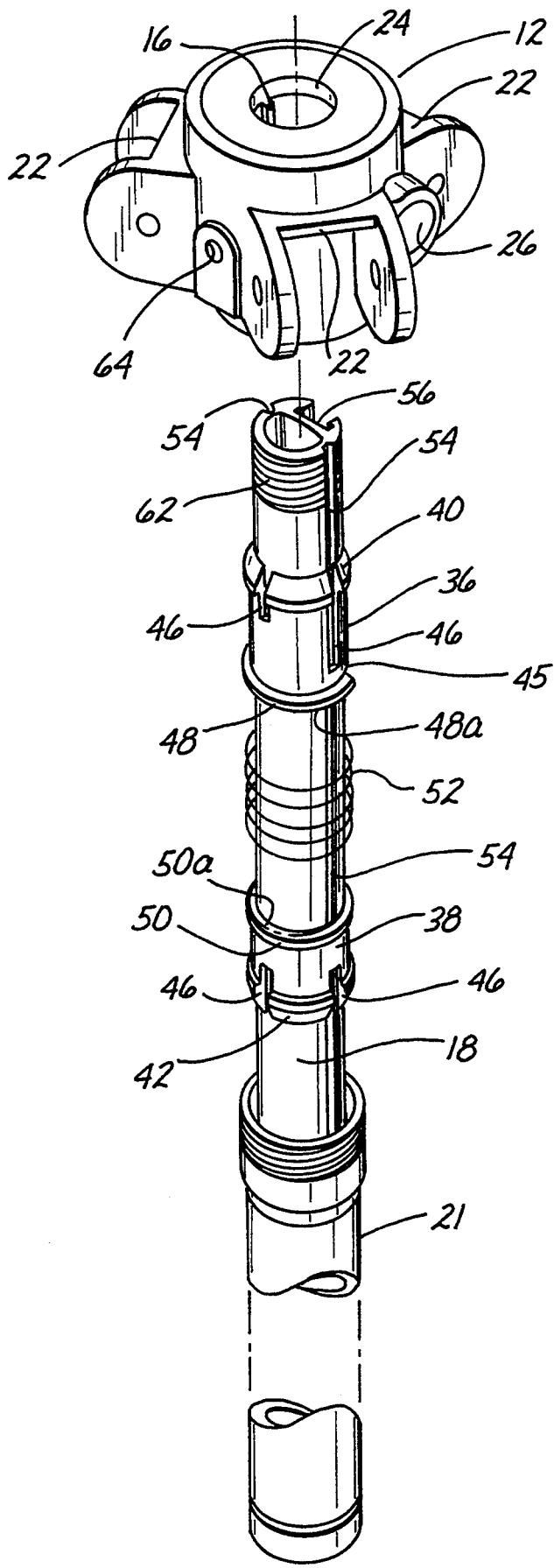
FIG. 2 is an axially exploded perspective view of the center column friction control assembly of this invention.

The details of the hub and center column assembly are better understood by reference to FIGS. 2 and 3. The hub 12 is a generally cylindrical body with three pairs of ears 22 which provide pivotal attachment points for the legs 14 of the tripod. A generally cylindrical bore 24 extends axially through the hub 12, and vertically in the tripod in FIG. 1. Near the top of the bore 24, a longitudinal section 26 of the bore has an inclined inner surface and diminishes in diameter in an upward direction, as best seen in FIG. 3. At the lower end of the bore 24 is a female screw thread 28. Key elements 16 extend in the axial direction in the bore 24 and are symmetrically arranged about the axis of the bore 24.

The leg mounting elements 22 are provided at three locations on the outer circumference of the hub 12, to each of which is pivotally attached the upper end of an extendable/retractable tripod leg 14.

An opening 26 formed in the hub 12 communicates with the bore 24. A freely rotating pinion 28 is mounted in the opening 26. A generally cylindrical center tube 21 has open upper and lower ends. At the upper portion of the center tube 21, is a section 30 of enlarged diameter connected to a section 32 of tapering diameter which widens in an upward direction along the center tube. A male screw thread 34 is formed on the outer surface of the tube segment 30. The center tube 21 is connected and fixed to the hub 12 by screwing the male thread 34 into the female thread 28.

Two sleeves 36 and 38, of generally cylindrical shape and made of synthetic resin are fitted axially in a space defined around the center column 18 by the inner surface of the bore 24 and by the enlarged portion 30 of the center column 21 which is connected to the bore 24.

The upper sleeve 36 fitted in the bore 24 of hub 12, has an upper end with a wedge shaped annular inclined contact surface 40 which slopes inwardly and narrows in diameter in an upward direction, towards its upper edge. The inclined surface 40 contacts the similarly inclined mating surface 26 of the bore 24 in hub 12. The lower sleeve 38 has a lower end with a wedge shaped annular inclined contact surface 42 which slopes inwardly towards the bottom, i.e., its diameter becomes narrower towards its lower edge. The inclined surface 42 makes contact with the similarly inclined inner mating surface 44 of the tapering segment 32 of the center column 21. Consequently, the upper sleeve 36 and the lower sleeve 38 are contained in an axial direction between the upper and lower mating surfaces 26 and 44.

A number of circumferentially spaced slits 46 are cut in an axial direction into the upper edge of the upper sleeve 36 and into the lower edge of the lower sleeve 38, dividing the end portions of the sleeves into fingers to allow flexing in a radial direction of the ends of the fingers which carry arc segments of the inclined contact surfaces 40, 42. The slits 38 include long slits 38, which are 2 to 3 times longer than the axial length of the inclined surfaces 40, 42, and shorter slits 38. The slits 38 may also he made as long as the entire length of the sleeves 36, 38.

Flanges 48 and 50 of enlarged diameter are formed at the lower edge of the upper sleeve 36 and the upper edge of the bottom sleeve 38, respectively. Concave grooves 48a and 50a are formed on the mutually facing axial end surfaces of the flanges 48 and 50. A cutout 45 is made in the upper sleeve 36 opposite the pinion 28.

A spring 52 is mounted between the flanges 48 and 50 of the sleeves 36, 38 respectively in an axially fully compressed condition as seen in FIG. 3. The spring elastically urges the upper sleeve 36 upwardly, and the lower sleeve 38 downwardly.

The spring 52 is selected to have a spring force appropriate to the size of the tripod, that is, appropriate to the anticipated weight of the camera to be mounted on the tripod 10.

The center column 18 slides freely in an axial direction through the interior of the upper and lower sleeves 36, 38, and has a certain degree of free play within the bore 24 and center column 21.

Grooves 54 are formed axially in the center column 18 at symmetrically spaced locations about the column axis. The male key elements 16 in the hub bore 24 mate with the grooves 54 in an axial direction, locking the column 18 against rotation about its axis. An axial groove 56 in the center column contains a gear rack 60 which is geared with the pinion 28. The upper end of the center pole 18 has a screw thread 62 for attachment of a universal tripod panning head, or the like. The center tube 21 receives almost the entire length of the center column 18. A screw hole 64 passes radially through hub 12 into the hub bore 24, and a screw 66, which can be turned to fix the center column 18 against movement through the hub 12, is threaded into the screw hole 64.

The operation of the improved tripod will now be explained.

The upper sleeve 36 can be tightly pressed against the center column 18 by turning and advancing the screw 66 radially inwardly towards the center column 18. In this manner, the center column 18 can be fixed to the hub 12.

In a condition where the screw 66 is loosened by unscrewing, the sleeves 36, 38 are urged apart in an axial direction by the force of the spring 52. The inclined surface 40 at the upper end of the top sleeve 36 makes contact with the inclined mating surface 26 in hub bore 24, and the ends of the fingers of the divided sleeve are pressed in a radially inward direction. The upper edge of the upper sleeve 36 is displaced inwardly in the radial direction, and presses against the center pole 18 in that direction with a constant force. The circumferentially segmented inclined surface 42 at the lower edge of the bottom sleeve 38 makes contact with the inclined mating surface 44 of the tapering segment 32 of the center tube 21, and the segments are pressed inwardly in the radial direction. Consequently, the lower edge of the bottom sleeve 38 is displaced inwardly in the radial direction and presses against the center column 18 in that direction with a constant force. An appropriate frictional resistance to sliding motion is applied to the center column 18 as a result of the friction between the inner surfaces of the sleeves 36, 38 and the outer surface of the center column 18.

As described above, since an appropriate resistance to sliding motion can always be applied to the center column 18 so that the center column 18 can be moved smoothly in a vertical direction by turning the crank 20 for driving the pinion 28 and gear rack 60, the operation of the center column 18 is improved. Since instability in the center column 18 can be avoided in this manner, unwanted movement of the camera while making photographs can also be prevented. Further, since abrupt movement of the center column 18 can be avoided, the possibility of damage to the pinion 28 and gear rack 60 can be prevented.

Although the sleeves 36, 38 may become deformed and worn during long-term use of the tripod 10, the force of spring 52 acts to urge the sleeves 36, 38 against the center pole 18 with constant pressure and consequently a constant resistance to sliding motion of the center column 18 can be nonetheless maintained.

Difficult adjustments such as the adjustment of a screw used in prior tripods for controlling resistance to sliding motion of a center column become unnecessary, and the handling of the tripod improved according to this invention is easier.

The preferred embodiment of the improved tripod described above makes use of coupled top and bottom sleeves 36, 38. Because the spring 52 is mounted between the sleeves 36, 38, friction is increased and resistance to sliding motion can be assured.

In the described embodiment of the improved tripod, a mechanism for adjusting the resistance to sliding motion is omitted. However, since normally the camera equipment is matched to a tripod of appropriate shape and size, no difficulties will normally be encountered so long as spring 52 is selected having a spring force appropriate to the tripod size and function.

Although the center column 18 can be displaced vertically by operation of the rack and pinion, 60, 28, the center column 18 can also be moved up and down manually.

While a presently preferred embodiment of the invention has been described and illustrated for purposes of clarity and example, it must be understood that many changes, modifications and substitutions to the described embodiment will become readily apparent to those possessed of ordinary skill in the art without thereby departing from the scope and spirit of the present invention which is defined by the following claims.

What is claimed:

1. A tripod for supporting video or photo equipment of the type having a plurality of telescopically extendable legs pivotably attached to a hub, a center column slidable through a bore in said hub, and a crank for turning a pinion engaged to a gear rack along said column for elevating and lowering the column; resilient means interposed between said column and said hub in said bore, spring means urging said resilient means axially along said column, and inclined mating surfaces operative for pressing said resilient means against said column to provide frictional resistance to displacement of the column through the hub.

2. The tripod of claim 1 wherein said inclined mating surfaces include an inclined surface in said bore.

3. The tripod of claim 1 wherein said resilient means comprise one or more sleeves slidable on said column.

4. The tripod of claim 1 wherein said spring means comprises a coil spring about said column.

5. The tripod of claim 1 wherein said resilient means comprises two sleeves slidable on said column and said spring means is compressed between said sleeves.

6. A tripod for supporting video or photo equipment of the type having a plurality of telescopically extendable legs pivotably attached to a hub, a center column slidable through a bore in said hub, and a crank for turning a pinion engaged to a gear rack along said column for elevating and lowering the column; sleeve means slidable on said column within said bore, said bore having a portion of diminishing diameter forming an inclined mating surface, coil spring means mounted for urging said sleeve means axially along said column against said inclined surface so that portions of said sleeve means are pressed against said column to provide frictional resistance to displacement of the column through the hub.

7. A tripod for supporting video or photo equipment of the type having a plurality of telescopically extendable legs pivotably attached to a hub, a center column slidable through a bore in said hub, a center tube fixed to said hub for receiving said column, and a crank for turning a pinion engaged to a gear rack on said column for elevating and lowering the column; sleeve means slidable on said column within said bore, said bore having a portion of diminishing diameter forming a first inclined mating surface, said center column having a portion of diminishing diameter forming a second inclined mating surface, first and second sleeves slidable on said column and contained between said inclined surfaces, a coil spring compressed between said sleeves for urging said sleeves apart so that portions of each of said sleeves are pressed by a corresponding one of said inclined mating surfaces against said column to provide frictional resistance to displacement of the column through the hub.

8. The tripod of claim 7 wherein said sleeves each have an end portion divided by longitudinal slits into segments having wedge shaped ends for engaging said corresponding one of said inclined mating surfaces so that said segments are pressed radially inwardly into frictional engagement with said column.

* * * * *